(12) United States Patent
Inoue et al.

(10) Patent No.: US 7,168,864 B2
(45) Date of Patent: Jan. 30, 2007

(54) FUSION SPLICING METHOD AND FUSION SPLICER FOR DIFFERENT-DIAMETER OPTICAL FIBERS

(75) Inventors: Koichi Inoue, Chiba (JP); Ng Wei Kiang, Chiba (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 10/832,326

(22) Filed: Apr. 27, 2004

(65) Prior Publication Data

US 2004/0213526 A1 Oct. 28, 2004

(30) Foreign Application Priority Data

Apr. 28, 2003 (JP) ............................. P2003-123357

(51) Int. Cl.
*G02B 6/255* (2006.01)
(52) U.S. Cl. .......................................... 385/96; 385/97
(58) Field of Classification Search ................... 385/96, 385/123
See application file for complete search history.

(56) References Cited

U.S. PATENT DOCUMENTS 6,780,274 B2 * 8/2004 Bernard et al. .......... 156/272.8

2003/0152342 A1 * 8/2003 Wang et al. ................... 385/96
2004/0071414 A1 * 4/2004 Liang et al. ................... 385/96

FOREIGN PATENT DOCUMENTS

| JP | 5-72439 A | 3/1993 |
|---|---|---|
| JP | 2958060 B2 | 7/1999 |
| JP | 11-287922 A | 10/1999 |
| JP | 2003-21745 A | 1/2003 |

* cited by examiner

*Primary Examiner*—Frank G. Font
*Assistant Examiner*—Eric Wong
(74) *Attorney, Agent, or Firm*—Sughrue Mion, PLLC

(57) ABSTRACT

A method of fusion splicing optical fibers with different diameters, comprising: (a) preheating for a predetermined period of time an end of a large-diameter optical fiber; (b) advancing relatively the small-diameter optical fiber toward large diameter fiber; (c) preheating for a predetermined period of time the ends of the both optical fibers; (d) advancing at least one of the optical fibers so that end faces of the optical fibers are brought into contact with each other; and (e) heating a predetermined period of time the faces of the optical fibers.

6 Claims, 3 Drawing Sheets

FUSION SPLICING METHOD AND FUSION SPLICER FOR DIFFERENT-DIAMETER OPTICAL FIBERS

CROSS REFERENCE TO RELATED APPLICATIONS

This application is based upon and claims the benefit of priority from the prior Japanese Patent Applications No. P2003-123357, filed on Apr. 28, 2003; the entire contents of which are incorporated herein by reference.

BACKGROUND OF THE INVENTION

1. Field of the Invention

The present invention relates to a fusion splicing method and a fusion splicer for different-diameter optical fibers, in which optical fibers with different diameters are heated by arc discharge, laser irradiation, and the like for fusion splicing.

2. Description of the Related Art

In some cases, optical fibers with different diameters are connected to each other. For example, optical fibers with outer diameters of 125 µm and 400 µm are connected. This optical fiber with an outer diameter of 400 µm often has a short length of about 2000 µm. Such a large-diameter and short-length optical fiber is not used as a normal optical transmission path but used as a optical device such as a collimator. Therefore, the term "optical fiber" may not be proper for such a material, but the material has a shape and a structure of an optical fiber. In the light of the shape and structure thereof, the term "optical fiber" is used in this application even if it is the optical device.

First, a description will be given of a conventional method of fusion splicing optical fibers with the same diameter. As shown in FIG. 3A optical fibers 21 and 22 are first aligned in X and Y directions such that central axes thereof coincide with each other and ends of the optical fibers 21 and 22 are spaced apart (for example, several hundreds µm). The X and Y directions are directions perpendicular to each other in a plane perpendicular to a Z direction (for example, horizontal and vertical directions in FIG. 3A), the Z direction being a direction of the axes of the optical fibers 21 and 22. Next, after completion of the alignment in the X and Y directions, the ends of the both optical fibers 21 and 22 are brought close to each other symmetrically with respect to a heating region 30 as shown in FIG. 3B, and the interval therebetween is maintained at, for example, about 10 to 20 µm. Preheating for a certain period of time (for example, several hundreds msec) is then performed. Without this preheating, the ends of the both optical fibers 21 and 22 remain hard, which tends to cause misalignment of the axes when end surfaces advance into contact with each other.

When the both end faces are softened, the optical fiber 21 on one side (for example, left side) is advanced, and the end face of the optical fiber 21 is brought into pressure-contact with the end face of the other optical fiber 22 as shown in FIG. 3C. Then, main heating performed for several seconds. Accordingly, the both end faces are fused and bonded to each other, thus achieving connection with low connection loss.

Fusion splicing different-diameter optical fibers is disclosed in the Japanese Patent Laid-Open publication No. 2003-21745. Preheating and main heating with the ends of the both optical fibers is performed while they are located at asymmetric positions with respect to the heating region, that is, with the ends of the both optical fibers asymmetrically located with respect to the center of the heating region.

Specifically, as shown in FIG. 4, the preheating is performed while the end of an optical fiber 11 with a small diameter is retracted from the center of a heating region 30 and the end of an optical fiber 12 with a large diameter is advanced to the vicinity of the center of the heating region 30. Subsequently, one of the optical fibers 11 and 12 is advanced, and the main heating is then performed with the optical fibers 11 and 12 brought into contact with each other.

The above described preheating with the ends of the both optical fibers 11 and 12 asymmetrically located with respect to the heating region 30 is for unequalizing amounts of heat to be applied to the both optical fibers 11 and 12. If positions of the ends of the optical fibers 11 and 12 with different diameters are symmetrically located with respect to the heating region 30 as in the case of the aforementioned optical fibers 21 and 22 with a same diameter, the amounts of heat to be applied to the optical fibers 11 and 12 are equalized.

Accordingly, the softening states of the both optical fibers due to the preheating are different from each other because the optical fibers 11 and 12 have different heat capacities according to the different diameters. For example, when an amount of heat proper suitable for the small-diameter optical fiber 11 is applied thereto, the end face of the large diameter optical fiber 12 remains hard because the amount of heat applied thereto is insufficient.

On the other hand, if the large diameter optical fiber 12 is applied with an amount of heat proper suitable therefor, an excessive amount of heat is applied to the small diameter optical fiber 11, and the end face thereof is excessively softened and increasingly fused. Accordingly, the end portion thereof changes in shape and in the extreme case becomes a spherical shape due to surface tension. However, if the amounts of heat to be applied to the both optical fibers 11 and 12 in the preheating are unequalized by performing the preheating while the positions of the ends of the optical fibers 11 and 12 with different diameters are arranged symmetrically with respect to the heating region 30 as described above, the respective optical fibers receive proper amounts of heat, thus such a disadvantage being eliminated.

Such unequalized heating is also described in the following Publications. The Japanese Patent No. 2958060 discloses a method of fusion splicing an optical fiber and a glass optical waveguide by carbon dioxide laser irradiation with the end faces thereof abutting on each other. In the method, a beam spot of the irradiated carbon dioxide laser beam is an ellipse, and an irradiation region on the glass waveguide side is made larger than that on the optical fiber side.

Thus, a larger amount of heat is applied to the glass optical waveguide, which has a larger heat capacity, than the optical fiber. In the Japanese Patent Laid-Open publication No. 5-72439, an end face of a waveguide and an end face of an optical fiber are fusion spliced by irradiation of an arc biased to the side of the end face of the waveguide. The arc is biased by biasing arc discharge with a magnetic field. The Japanese Patent Laid-Open publication No. 11-287922 discloses a case where a quartz optical fiber and a non-quartz optical fiber are heated by arc discharge or laser beam irradiation for fusion splicing. In this case, only the non-quarts optical fiber is heated while a distance between the end faces of the both optical fibers is maintained at 0 to 20 µm, thereby only the non-quarts optical fiber is softened and fused to be fusion-spliced to the quartz optical fiber.

However, all the conventional arts disclosed in the above Publications implement the unequalized heating by adjusting the spatial relationship between the heating region and a position in which end faces of the both optical fibers abut on each other. Accordingly, the conventional arts have low degrees of freedom of the adjustment, and cases to which the conventional arts can be applied are limited. Specifically, in the case of fusion splicing optical fibers with different diameters, the difference between the heat capacities thereof varies, and it is required to adjust the unequality of the amounts of heat to be applied thereto according to the difference. However, it is not easy to freely adjust the unequality of the amounts of heat to be applied only by adjusting the spatial relationship.

The present invention has been made in the light of the aforementioned problem. And an object thereof is thus to provide a fusion splicing method and a fusion splicer for optical fibers with different diameters, which are improved so as to facilitate proper adjustment of unequality of amounts of heat to be applied to end faces of optical fibers with different diameters by controlling amounts of heat applied thereto in terms of time and thus easily perform optimal fusion splicing of the different-diameter optical fibers.

SUMMARY OF THE INVENTION

In order to achieve the aforementioned object, a fusion splicing method for optical fibers with different diameters according to claim 1 of the present invention comprises: (a) preheating for a predetermined period of time an end of a large-diameter optical fiber; (b) advancing relatively the small-diameter optical fiber toward large diameter fiber; (c) preheating for a predetermined period of time the ends of the both optical fibers; (d) advancing at least one of the optical fibers so that end faces of the optical fibers are brought into contact with each other; and (e) heating a predetermined period of time the faces of the optical fibers.

In the fusion splicing method for optical fibers with different diameters according to claim 2 of the present invention, the preheating at step (c) is performed while a distance between the end faces of the optical fibers is maintained at a predetermined distance.

In the fusion splicing method for optical fibers with different diameters according to claim 3 of the present invention, the preheating at step (c) is preformed while the small-diameter optical fiber is being advanced at a predetermined speed.

In the fusion splicing method for optical fibers with different diameters according to claim 4 of the present invention, the preheating at step (a) is preformed while the small-diameter fiber is retracted so that the end thereof is located away from a heating region after adjustment of axis alignment of the optical fibers is carried out.

In the fusion splicing method for optical fibers with different diameters according to claim 5 of the present invention, in the step (c), the larger diameter fiber is located at a position in a heating region and the smaller diameter fiber is located at a position away from a hearing region.

In the fusion splicing method for optical fibers with different diameters according to claim 6 of the present invention, in the step (c), the smaller diameter fiber is located at a position away from a hearing region and substantially maintain stiffness thereof.

A fusion splicer for splicing optical fibers with different diameters according to claim 7 of the present invention, comprises: a setting module configured to set an end face of a small-diameter optical fiber and an end face of a large-diameter optical fiber; an advancing module configured to advance the small-diameter optical fiber relatively toward the large-diameter optical fiber; a heating module configured to include a heating region; and a control module configured to control the advancing module and the heating module to perform first preheating for a predetermined period of time in a state where an end of the small-diameter optical fiber is spaced from a heating region and an end of the large-diameter optical fiber is located within the heating region; perform second heating for a predetermined period of time in a state where the ends of the both optical fibers are located within the heating region by advancing the small-diameter optical fiber; perform main heating for a predetermined period of time in a state where the end faces of the both optical fibers are brought into contact with each other by advancing at least one of the optical fibers.

In these fusion splicing method and fusion splicer for optical fibers with different diameters, preheating performed with the end faces of the small-diameter and large-diameter optical fibers spaced from each other before main heating performed with the end faces thereof brought into contact with each other is separated into two time zones of first heating and second heating. The spatial relationship between the ends of the both optical fibers with respect to the heating region and the heating time are determined in each of the first and second preheating. Accordingly, it is possible to sensitively adjust the amount of heat applied to each optical fiber at ease, thus increasing the degree of freedom in adjusting the unequality of the amounts of heat to be applied to the both optical fibers as well as realizing facilitation of the adjustment. Therefore, optimal fusion splicing can be easily performed in any cases of fusion splicing optical fibers with different diameters.

DETAILED DESCRIPTION OF THE INVENTION

Figure 1A:
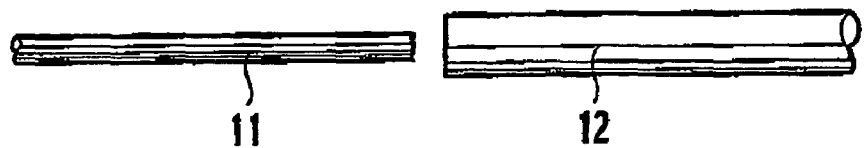
FIGS. 1A to 1D are schematic views conceptually showing an embodiment of a fusion splicing method for optical fibers according to the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth to provide a thorough understanding of the present invention. However, it will be obvious to those skilled in the art that the present invention may be practiced without such specific details.

FIGS. 1A to 1D are schematic views conceptually showing an embodiment of a fusion splicing method for optical fibers according to the present invention. As shown in FIG. 1A a small-diameter optical fiber 11 and a large-diameter optical fiber 12, which are to be fusion spliced, are first adjusted in positions of axes thereof such that end faces thereof abut on each other.

Specifically, the positions of the both optical fibers 11 and 12 are adjusted in horizontal and vertical directions (X and Y directions in FIG. 2) in a plane perpendicular to an axis direction (Z direction in FIG. 2) of the optical fibers 11 and 12. This axis adjustment is performed while end faces of the both optical fibers 11 and 12 are separate from each other.

Figure 1B:
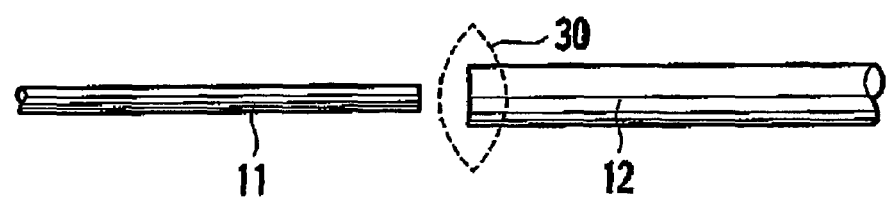

Next, as shown in FIG. 1B, the small-diameter optical fiber 11 is retracted so that the end face thereof is several tens to several hundreds μm apart from the center of a heating region 30, while the end face of the large-diameter optical fiber 12 is located in the vicinity of the center of the heating region 30.

The optical fibers 11 and 12 are positioned so that the end face of the small-diameter optical fiber 11 is located out of the heating region 30 and the end face of the large-diameter optical fiber 12 is located within the heating region 30 as described above. Then the fiber 12 is heated in a first preheating. This first preheating is performed for a several seconds. The preheating time period depends on 1) a type of heat source such as arc discharge, laser irradiation including carbon dioxide laser irradiation, or other high frequency heating, 2) a size of the heating region 30, and 3) diameters and heat capacities of the both optical fibers 11 and 12. Thus the period is determined by repeated experiments and the like in advance. In the heating region 30 the amount of heat decreases as a distance from the center increases.

Accordingly, an optical fiber 11 spaced from the heating region 30 is heated a little. Therefore, it is required to determine the position of the end of the small-diameter optical fiber 11 according to the spatial distribution of the amount of heat. Generally, the end of the small-diameter optical fiber 11 is located at a distance several tens to several hundreds μm apart from the center of the heating region 30 as described above.

In this first preheating, the end portion of the small-diameter optical fiber 11 is hardly heated because the small-diameter optical fiber 11 is located out of heating region 30. On the other hand, the end portion of the large-diameter optical fiber 12 is significantly heated because the end of the large-diameter optical fiber 12 is located within the heating region 30.

Figure 1C:
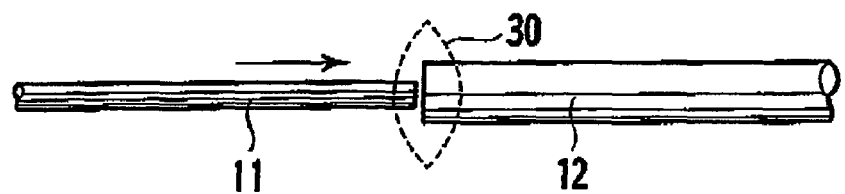

Next, as shown in FIG. 1C, the small-diameter optical fiber 11 is advanced as indicated by an arrow, and the end thereof is located in the vicinity of the center of the heating region 30. At this time, the distance between the end faces of the both optical fibers 11 and 12 is set to for example 10 to 20 μm. A second preheating is then performed under such a spatial relationship. The ends of the both optical fibers 11 and 12 are located within the heating region 30 and heated together for around one second. The period of the second preheating depends on the position of the end face of the small-diameter optical fiber 11 and factors similar to those described above and is determined by experiments or the like.

Figure 1D:
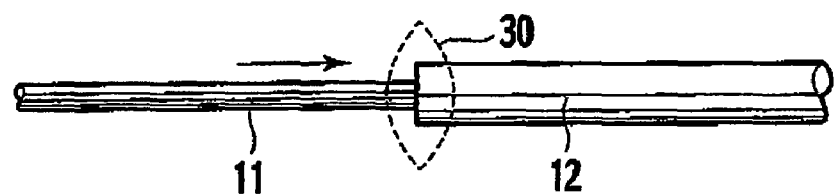

After completion of the second preheating, only the small-diameter optical fiber 11 is advanced as indicated by an arrow of FIG. 1D. The end face thereof is brought into contact with the end face of the large-diameter optical fiber 12 and presses the same with a predetermined force. Then a main heating is performed for a certain period of time. The period of the main heating step is also determined through experiments and the like in consideration of factors similar to those described above.

As described above, the fusion splicing step is composed of heating steps at the temporal stages, that is, the first and second preheating and the main heating steps. The first and second preheatings achieve proper softening of the ends of the both optical fibers 11 and 12.

Specifically, the end portion of the small-diameter optical fiber 11 is hardly heated in the first preheating and preheated only for the period of time of the second preheating. On the other hand, the end portion of the large-diameter optical fiber 12 is heated in both of the first and second preheatings, so that the heating time becomes longer that that for the small-diameter fiber. Therefore, it is possible to suitably soften the respective small-diameter and large-diameter optical fibers 11 and 12 by determining heating times optimal for the respective optical fibers 11 and 12 according to the heat capacities thereof.

After that, the main heating is performed with the end faces of the both optical fibers 11 and 12 having optimal softening degrees, brought into contact with each other. This very good fusion splicing of the end faces of the optical fibers 11 and 12 is achieved.

In the aforementioned main heating step, only the small-diameter optical fiber 11 is advanced. However, only the large-diameter optical fiber 12 may be advanced, or both thereof may be advanced.

Next, a description will be given of a fusion splicing method for optical fibers with different diameters according to a second embodiment. This second embodiment differs from the aforementioned embodiment only in the second preheating. In the first embodiment, the second preheating is performed while the small-diameter optical fiber 11 is advanced and then stopped. However, in the second embodiment, the second preheating is performed while the small-diameter optical fiber 11 continues advancing without stopping.

In this case, the speed at which the small-diameter optical fiber 11 advances is previously determined by the condition as follows. The end portion of the small-diameter optical fiber 11 should receive a suitable amount of heat in the course that the small-diameter optical fiber 11 moves within the heating region 30. In other words, for a period which the small-diameter optical fiber 11 stays within the heating region 30. The end portion of the small-diameter optical fiber 11 should be softened neither too much nor too little at the time when the second preheating is finished.

This speed is obtained by experiments and the like in consideration of the size of the heating region 30, temperature, the amount of heat to be applied, the heat capacity of the small-diameter optical fiber 11, and the like.

In the second embodiment step with the small-diameter optical fiber 11 being advanced, the end face of the small-diameter optical fiber 11 is brought into contact with the end face of the large-diameter optical fiber 12 at the time when this step is finished. Therefore, the subsequent main heating step is performed sequentially with this second preheating.

Figure 2:
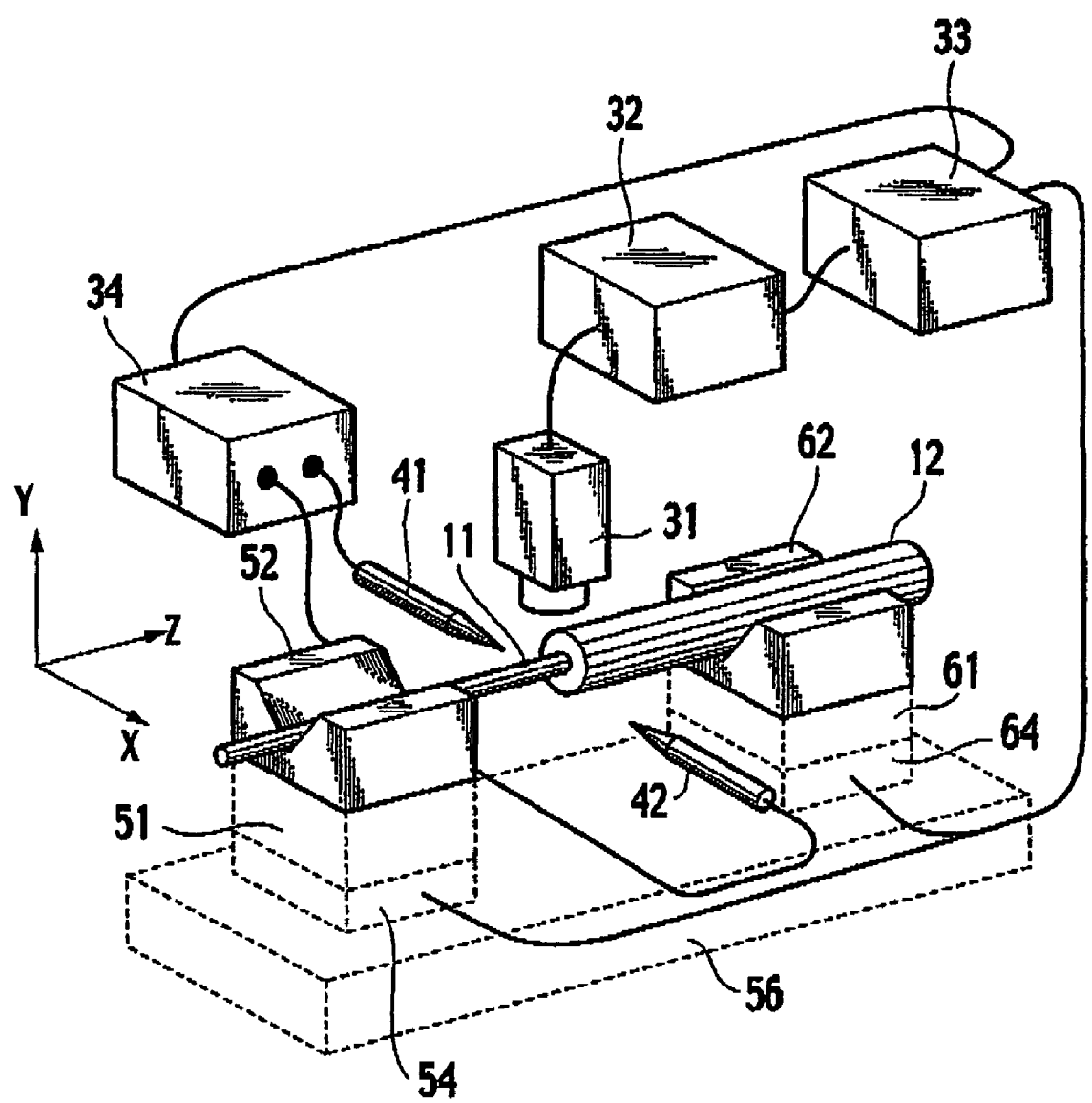
FIG. 2 is a schematic view conceptually showing an embodiment of a fusion splicer for optical fibers according to the present invention.
Figure 3A:
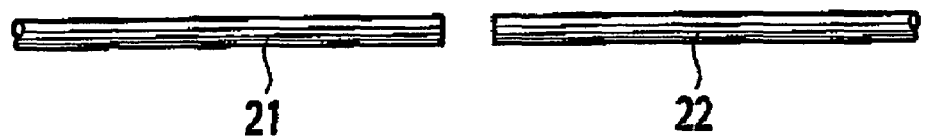
FIGS. 3A to 3C are schematic views conceptually showing a conventional fusion splicing method for same-diameter optical fibers.
Figure 3B:
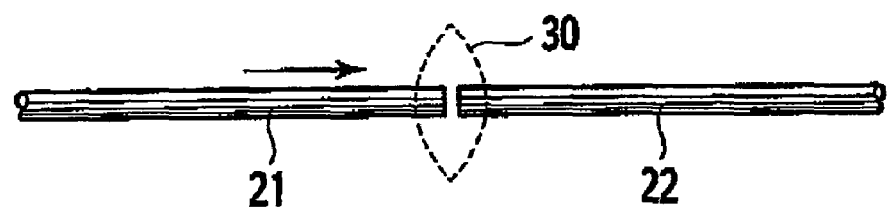
Figure 3C:
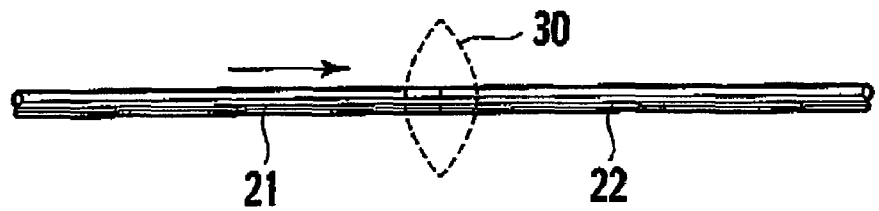
Figure 4:
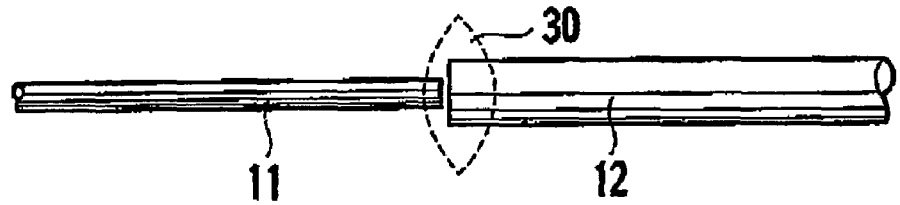
FIG. 4 is a schematic view conceptually showing a conventional fusion splicing method for different-diameter optical fibers.

A description will be given of an embodiment of a fusion splicer implementing the fusion splicing methods as described above. FIG. 2 is a schematic view conceptually showing a fusion splicer for optical fibers with different diameters. In FIG. 2, V-groove blocks 52 and 62 constitute part of setting means for abuttingly setting the end faces of the small-diameter and large-diameter optical members 11 and 12 to be spliced to each other. The optical fibers 11 and 12 are positioned by being put in V grooves of the V-groove blocks 52 and 62. A clamp mechanism clamping and holding the optical fibers 11 and 12 also constitutes part of the setting means, which is omitted in the drawing. The V-groove blocks 52 and 62 are mounted on moving blocks 51 and 61. The moving blocks 51 and 61 are placed on a base 56 and configured to be driven by motors 54 and 64 and the like to move over the base 56 in directions of X, Y, and Z axes. Herein, the Z axis is the axis direction (horizontal direction) of the optical fibers 11 and 12, the X axis is a horizontal direction perpendicular to the axes of the optical fibers 11 and 12, and the axis Y is a vertical direction perpendicular to the axes of the optical fibers 11 and 12.

Discharge electrodes (sticks) 41 and 42 are arranged in the X direction herein so as to face each other and fixed by a proper mechanism omitted in the drawing. These discharge electrodes 41 and 42 are supplied with high voltage from the discharge power supply 34, and arc discharge is generated between the discharge electrodes 41 and 42. The abutting portions of the optical fibers 11 and 12 are heated by the arc discharge to be fusion spliced to each other.

An imaging unit such as a CCD camera 31 and a C-MOS camera is arranged so as to pick up an image of the abutting portions of the optical fibers 11 and 12. An image signal outputted from the CCD camera 31 is transmitted to an image processing unit 32 for image processing. Information obtained by the image processing is transmitted to a controller 33, with which the motors 54 and 64 and the like are controlled as well as the discharge power supply 34. The controller 33 is connected to an input device such as an operable switch and a keyboard, an image monitor to display the image information transmitted from the image processing unit 32, and the like, which are not shown in the drawing.

In the fusion splicer thus constituted, adjustment of axis alignment of the optical fibers 11 and 12 set on the V-groove blocks 52 and 62 is automatically carried out by the image processing unit 32 and the controller 33 based on the image signal from the CCD camera 31. Specifically when the optical fibers 11 and 12 are respectively arranged on the V-groove blocks 52 and 62 and clamped by the clamp mechanism, the CCD camera 31 captures the image of the end portions of the both optical fibers 11 and 12, the image is then processed by the image processing unit 32. The motors 54 and 64 and the like are controlled with the processed image through the controller 33 to change the positions of the moving blocks 51 and 61 in the X and Y directions so as to coincide the axes of the both optical fibers 11 and 12.

Subsequently, the small-diameter optical fiber 11 is retracted, and the end thereof is located out of an arc formed by the discharge electrodes 41 and 42. On the other hand, the end of the large-diameter optical fiber 12 is located at the center of the arc. Then, high voltage is applied between the discharge electrodes 41 and 42 by the discharge power supply 34 to generate arc discharge between the arc electrodes 41 and 42. The above described positional control of the optical fibers 11 and 12 and control of the power supply 34 are performed by the controller 33. This first preheating is carried out for a certain period of time, in which the end of the small-diameter optical fiber 11 is hardly heated and only the end of the large-diameter optical fiber 12 is heated. As for the period of time of the first preheating, a value obtained by previously performing experiments and the like is stored in the controller 33 in advance, and the controller 33 controls the period of time of the first preheating based on the stored value.

After completion of the first preheating, the small diameter optical fiber 11 is advanced, and the end thereof is located within the arc between the discharge electrodes 41 and 42. Subsequently, the second preheating is carried out, in which the ends of the both optical fibers 11 and 12 are heated. The second preheating is also controlled by the controller 33. Specifically, information previously obtained by experiments and the like is stored in the controller 33, and the controller 33 controls the positions of the optical fiber 11 and the like and the power supply 34 based on the stored information so that the ends of the both optical fibers 11 and 12 are heated within the arc for a predetermined period of time.

Subsequently, the controller 33 performs the main heating step. In this main heating step, the small-diameter optical fiber 11 is advanced, and the end thereof is brought into pressure contact with the end of the large-diameter optical fiber 12. Arc discharge is then carried out for a predetermined period of time in this state. It should be noted that only the large-diameter optical fiber 12 may be advanced or the both optical fibers 11 and 12 may be advanced so that the ends thereof are brought into contact with each other. The positional control of the optical fiber 11 and the like and the control of the power supply 34 for the arc discharge are carded out based on the information previously obtained and stored in the controller 33.

As described above, with the control by the controller 33, the end of the small-diameter optical fiber 11 is heated only in the second preheating while the end of the large-diameter optical fiber 12 is heated in both of the first and second preheatings. Accordingly, the ends of the small-diameter and large-diameter optical fibers 11 and 12 are applied with proper amounts of heat according to the heat capacities thereof and softened neither too much nor too little before the both end faces are brought into contact with each other. The both end faces are brought into contact with each other in the optimally softened state and subjected to the main heating step to be fusion spliced, thus achieving very good fusion splicing. The information on the positions of the optical fiber 11 and the like in each step and the information on the heating time in each step are obtained by experiments previously performed and the like and stored in the controller 33. Moreover, in order to control the positions of the optical fiber 11 and the like, the image information from the CCD camera 31 is processed by the image processing unit 32.

The controller 33 is adapted to perform the second preheating for a certain period of time in the state where the end of the small-diameter optical fiber 11 is advanced into the arc and stopped. However, the controller 33 may be adapted to perform the second preheating while the end of the small-diameter optical fiber 11 is being advanced in the arc without being stopped like the above. In this case, determining the advance speed is determining the period of time for which the end of the small-diameter optical fiber 11 stays in the arc, that is, the heating time. Accordingly, this advance speed depends on the heat capacity of the small-diameter optical fiber 11, the amount of heat to be applied per unit time within the arc, and the like. Therefore, it is possible to obtain an optimal speed value by previously performing experiments and the like, and this value should be just held in the controller 33.

It also can be configured to previously store the control information of both of the second preheating with the small-diameter optical fiber 11 being stopped and the second preheating with the small-diameter optical fiber 11 being advanced and allow an operator to select one of the both with an operation of the input device and the like. In addition, the aforementioned embodiment is configured so that the controller 33 automatically controls each step based on the information stored inside. However, it can be configured to manually adjust the positions of the end faces of the optical fibers 11 and 12 and each heating time with an operation of the input device. Similarly, it can be configured to manually adjust the advance speed thereof as well in the case of performing the second preheating with the small-diameter optical fiber 11 being advanced.

Furthermore, the aforementioned configuration is related to an example for convenience of description, and it is obvious that various configuration can be employed other than the aforementioned configurations as specific configurations and the like. For example, each of the numerical values including the distance between the end faces of the aforementioned optical fibers 11 and 12 and the heating times thereof is just an example. The arc discharge is used as a heat source in the aforementioned embodiments, but other heat sources can be used including carbon dioxide laser irradiation and the like. Furthermore, after the axis adjustment is performed in the state where the optical fibers 11 and 12 are close to each other as shown in FIG. 1A, the optical fibers 11 and 12 are moved apart from each other as shown in FIG. 1B, and then the first preheating is performed. However, it may be configured to perform the axis adjustment in the state shown in FIG. 1B and start the first preheating as it is. It can be configured that the moving blocks 51 and 61 do not move the V-groove blocks 52 and 62 in the X and Y directions but only in the Z direction. Other modifications can be made without departing from the scope of the present invention.

As described above, according to the fusion splicing method and the fusion splicer for optical fibers with different diameters of the present invention, the preheating of softening the end faces of the optical fibers to be spliced before bringing the end faces into contact with each other is separated into the first and second preheatings, and the first heating step is adapted not to heat the small-diameter optical fiber but to heat only the large-diameter optical fiber while the second heating step is adapted to heat the both optical fibers. Accordingly, it is easy to optimize the amount of heat applied to each optical fiber in the entire first and second preheatings and soften the both optical fiber neither too much nor too little by properly determining the amounts of heat (heating time) to be applied thereto in each of the first and second preheatings. Therefore, it is possible to well fusion splice any small-diameter and large-diameter optical fibers with different heat capacities at very ease by only adjusting the period of time of each of the first and second preheatings. As described above, the fusion splicing method and the fusion splicer of the present invention includes a high degree of freedom in adjusting the amounts of heat applied to the individual small-diameter and large-diameter optical fibers and can cope with any differences in heat capacity while only adjusting the period of time of each of the first and second preheatings.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A method of fusion splicing optical fibers with different diameters, comprising:
    (a) preheating for a predetermined period of time an end of a large-diameter optical fiber;
    (b) advancing relatively the small-diameter optical fiber toward the large diameter fiber;
    (c) preheating for a predetermined period of time the ends of both the large-diameter and the small-diameter optical fibers;
    (d) advancing at least one of the optical fibers so that end faces of the large-diameter and the small-diameter optical fibers are brought into contact with each other; and thereafter
    (e) heating the faces of both the large-diameter and the small-diameter optical fibers for a predetermined period of time while they are in contact with each other.

2. The method of claim 1, wherein the preheating at step (c) is performed while a distance between the end faces of the optical fibers is maintained at a predetermined distance.

3. The method of claim 1, wherein the preheating at step (c) is performed while the small-diameter optical fiber is being advanced at a predetermined speed.

4. The method of claim 1, wherein the preheating at step (a) is performed while the small-diameter fiber is retracted so that the end thereof is located away from a heating region after adjustment of axis alignment of the optical fibers is carried out.

5. The method of claim 1, wherein in the step (a), the larger diameter fiber is located at a position in a heating region and the smaller diameter fiber is located at a position away from the heating region.

6. The method of claim 1, wherein in the step (a), the smaller diameter fiber is located at a position away from a heating region and substantially maintain its stiffness.

* * * * *